May 28, 1968     S. G. VARSOS     3,386,078
SELF-AUTHENTICATING PULSE DETECTOR
Filed Sept. 21, 1964     6 Sheets-Sheet 1

FIG. 1

INVENTOR.
SPYROS G. VARSOS
BY
ATTORNEY

FIG. 2

INVENTOR.
SPYROS G. VARSOS

INVENTOR.
SPYROS G. VARSOS
BY
ATTORNEY

May 28, 1968        S. G. VARSOS        3,386,078

SELF-AUTHENTICATING PULSE DETECTOR

Filed Sept. 21, 1964

FIG. 6A

INVENTOR.
SPYROS G. VARSOS
ATTORNEY

FIG. 6B

United States Patent Office 3,386,078
Patented May 28, 1968

3,386,078
SELF-AUTHENTICATING PULSE DETECTOR
Spyros G. Varsos, Orange County, Fla., assignor to Martin-Marietta Corporation, Middle River, Md., a corporation of Maryland
Filed Sept. 21, 1964, Ser. No. 397,965
15 Claims. (Cl. 340—146.1)

ABSTRACT OF THE DISCLOSURE

This invention relates to a pulse detector employing selective logic for demodulating pulse modulated information, and more particularly to a novel, self-authenticating pulse detector whereby no signal pulse selection occurs during any sample period unless the largest pulse present during such sample period is larger by a desired threshold value than the next largest pulse present during the same sample period.

---

Although the self-authenticating pulse detector of the present invention is particularly applicable in pulse communication systems which utilize time shift keying (TSK) as the modulation format, it is equally usable in combination with pulse communication systems utilizing pulse position (PPM) as the modulation format. A communication system of the latter type is disclosed in the McKay Goode patent application, S.N. 107,194, filed May 2, 1961, now Patent No. 3,239,761, which is assigned to the assignee of the present invention.

For purposes of clarity, TSK modulation as it appears herein relates to a modulation format wherein each sample period is divided into at least two time slots wherein the digital data transmitted is represented by the "mark-space" format of such time slots. In the exemplary embodiments of the present invention, a two level TSK format is described wherein the digit ONE is represented by a "space" in the first time slot and a "mark" in the second time slot, and the digit ZERO is represented by a "mark" in the first time slot and a "space" in the second time slot. Since it will be obvious to those skilled in the art that the present invention can be modified to process other pulse modulation formats, so it will suffice merely to state here that, (1) the signal pulse handling capacity of the selective logic circuits of the exemplary embodiments hereof must be increased when the invention is used in a system in which the sample periods have more than two time slots; and (2) the decoder utilized must be adapted to process the data it receives and convert it to the desired intelligence format.

In many of the more recently developed pulse-coded communication systems, serious problems are encountered regarding correct selection of the signal pulse when excessive noise and other extraneous energies are concurrently present during preselected sample periods. Regardless of the type of modulation scheme used, the presence of random energy concurrently with signal pulses invariably results in a high percentage of erroneous pulse selection. Skilled artisans in the pulse communication art having attempted to reduce this undesirable high percentage of erroneous pulse selection. Some improvement in pulse selection accuracy has been achieved, but by and large the percentage of accuracy is not within accepted and desired limits. It has been established with reasonable certainty that in a pulse time position modulation format, such as PPM or TSK modulation, it is frequently better to disregard the demodulated intelligence received during sample periods in which excessive random energy also occurs and use statistical signal determining techniques to establish what intelligence is to be used during this particular sample period. That is to say, rather than demodulating or detecting pulse information during a sample period in which excessive commissive or omissive errors occur, or in which high level random energy exists, it is more accurate either to omit pulse selection during this sample period or to utilize a "most-probable-pulse" selection technique for determining what information should be used as the transmitted intelligence. Examples of "most-probable-pulse" selection techniques are disclosed in the patent applications of Richard A. Branham, entitled "Pulse Weighting Demodulator," Ser. No. 335,718, now Patent No. 3,353,108, Spyros G. Varsos, entitled "Pulse Selecting Device," Ser. No. 348,210, and Billy W. Whitlow, entitled "Pulse Selector," Ser. No. 356,147, each of which are assigned to the assignee of the present invention.

In most of the prior known pulse communication systems, the demodulators for detecting signal pulse position are provided with circuit means for comparing the energy occurring during each time frame or time slot of a sample period with the energies occurring during each other time frame or time slot of that same sample period. These prior known systems also provide means for selecting, as the pulse position intelligence, that time frame which contains more energy than any other time frame. Although systems of this type do provide a fair degree of pulse selection accuracy, they are unsatisfactory when the system is operated in a high random energy or noise environment, or when the errors are predominately omissive or predominately commissive. The present invention uniquely increases pulse selection accuracy by virtue of a self-authenticating pulse detection feature and an error pulse generating characteristic.

In accordance with one embodiment of the present invention, which is particularly designed for use in a pulse communication system utilizing a TSK modulation format, gate means are provided for separating the energy contained in each time slot of each sample period and for coupling such separated energies to first and second storage means. The stored energies are then independently summed with a predetermined bias voltage for developing first and second summation voltages. First and second comparing means are then utilized to independently compare the first stored voltage with the second summation voltage and for comparing the second stored voltage with the first summation voltage. The circuit is uniquely designed so that if the energy in the first time slot (first stored voltage) exceeds the energy in the second time slot by a value greater than the bias voltage (second stored voltage plus bias voltage), a high or positive voltage is developed by the first comparing means; but if the energy in the second time slot (second stored voltage) exceeds the energy in the first time slot by a value greater than the bias voltage (first stored energy pulse bias voltage), a high or positive voltage is developed by the second comparing means. It should be noted that if the energy in the first time slot does not exceed the energy in the second time slot by an amount greater than the bias voltage or vice versa, both of the comparing means will develop a low or negative voltage. The voltages developed by the comparing means are then independently coupled to first and second threshold devices, such as trigger means, and depending upon the voltage levels coupled thereto, such threshold devices will be driven either into their high or into their low current conducting state. The outputs of the two threshold devices are then coupled to a decoder for processing or converting this digital information into digital data or audio information, as the case may be. The decoder is also capable of generating an error signal whenever the outputs of the two trigger means are both low or negative. This error signal may then be utilized to trigger external decision circuits, such as "most-probable-pulse" selection circuits.

It is accordingly a primary object of the present invention to provide a novel detector employing selective logic for demodulating pulse modulated intelligence.

It is another object of the present invention to provide a novel self-authenticating pulse detector which selects a signal pulse during each sample period only if the highest pulse present exceeds the next highest pulse by a desired threshold value.

It is another object of the present invention to provide a novel self-authenticating pulse detector which utilizes selective logic to determine whether the information received during any one sample period is reliable.

It is another object of the present invention to provide a novel self-authenticating pulse detector which is capable of accurately decoding pulse intelligence transmitted in a TSK modulation format.

It is another object of the present invention to provide a novel self-authenticating pulse detector which employs selective logic for demodulating TSK modulated intelligence, whereby no signal pulse selection occurs during any sample period unless the largest pulse present during such sample period is larger by a desired threshold value than the next largest pulse present during the same sample period.

It is another object of the present invention to provide a novel self-authenticating pulse detector which employs selective logic for demodulating TSK modulated intelligence, whereby an error signal is generated whenever the largest pulse occurring during any sample period does not exceed by a predetermined value the next largest pulse occurring during that same sample period, with such error pulse being advantageously utilized to control associated "most-probable-pulse" circuits.

It is another object of the present invention to provide a novel self-authenticating pulse detector which employs selective logic for demodulating TSK modulated intelligence, which detector is advantageously capable of circuit association with a majority decision pulse sampling circuit.

These and further objects and advantages of the present inventions will become more apparent upon reference to the following claims and the appended drawings wherein:

Figure 1:
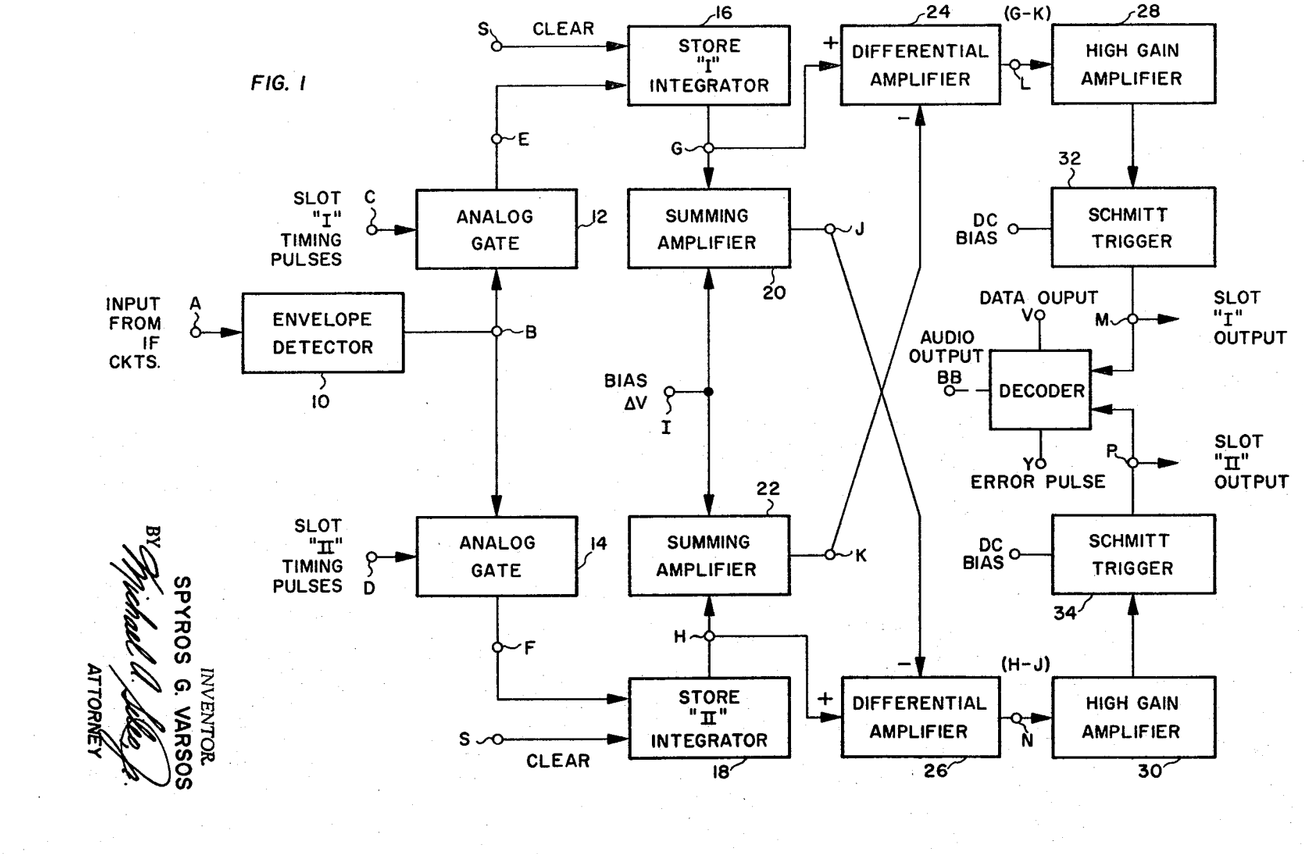
FIGURE 1 is a block diagram of the self-authenticating detector in accordance with the present invention, with the pulse modulated RF energy developed by conventional IF circuits (not shown) being applied to terminal A and the digital output information appearing at terminals M and P.

It should be noted here that the exemplary embodiments of the present invention as shown in the drawings hereof are particularly described in combination with a pulse communication system employing Time Shift Keying (TSK) modulation. In FIGURE 1 the novel self-authenticating pulse detector depicted utilizes a TSK modulation format in which each sample period is divided into two time slots, "I" and "II," with digital ZERO being represented by a "pulse" in time slot "I" and "no pulse" in time slot "II," and digital ONE being represented by "no pulse" in time slot "I" and a "pulse" in time slot "II." A decoder is generically shown in FIGURE 1 with output terminals for digital data, audio signals and error pulses. The circuit of FIGURES 3 and 4 may be utilized as the decoder in FIGURE 1 when digital data and error pulse information, as well as a majority decision feature, is desired; whereas the circuit of FIGURES 5, 6A and 6B may be used as the decoder in FIGURE 1 when conventional TSK modulation is used and audio output is desired.

Figure 2:
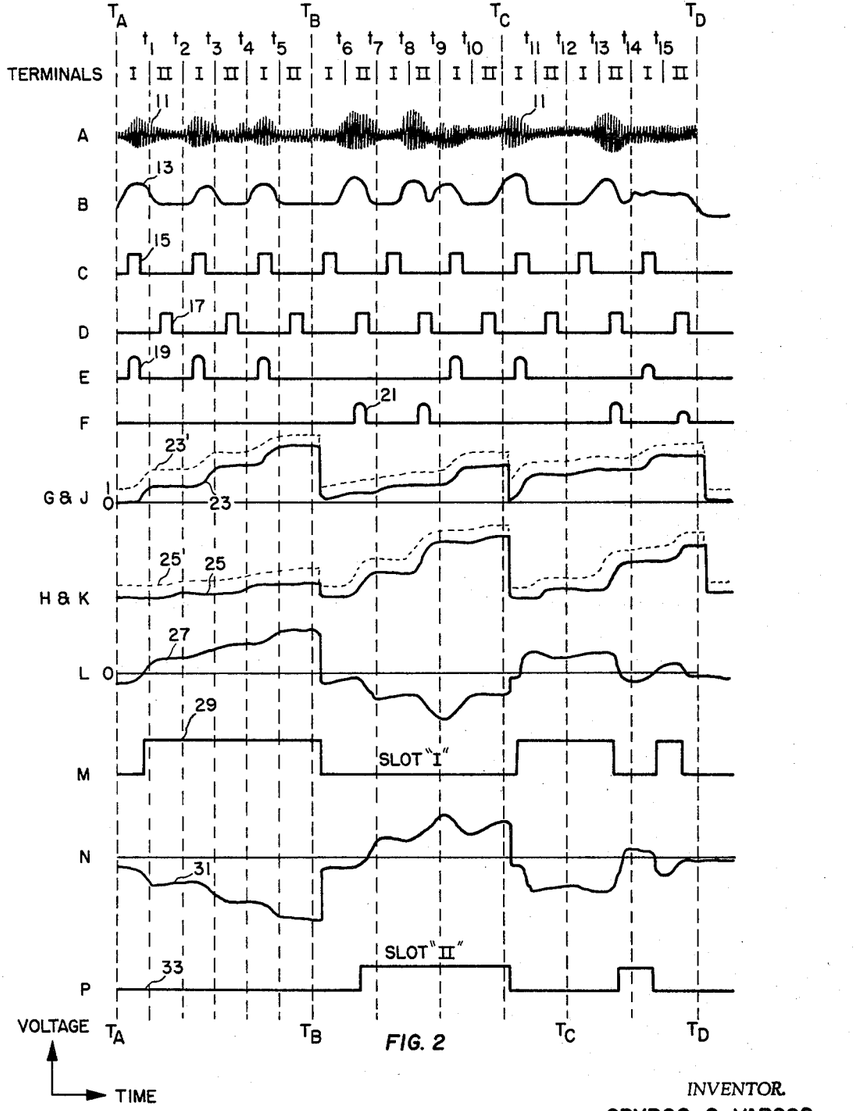
FIGURE 2 depicts waveforms present at several appropriate terminals in the block diagram of FIGURE 1, with the vertical dash lines, which represent pertinent time periods, being included to assist in the detailed explanation of the circuit of FIGURE 1 and its mode of operation.

DETAILED DESCRIPTION.—FIGURES 1 AND 2

Referring now to the block diagram of FIGURE 1, in light of the waveforms of FIGURE 2, the envelope detector 10 is provided for demodulating the pulse modulated, RF waves applied to its input terminal A. In this embodiment waveform 11 represents the input being applied to envelope detector 10, and may be, for example, the output of conventional IF circuits (not shown). It is not essential in the description of this invention to describe any specific circuits for developing waveform 11, which is merely a pulse modulated, RF wave in a two-level TSK format.

The output of the envelope detector 10 (see waveform 13), which appears on terminal B, is simultaneously coupled to the analog gates 12 and 14. Gates 12 and 14 are controlled by timing pulses 15 and 17, which are applied to the gates via terminals C and D, respectively. Although the timing pulses 15 and 17 may be developed by any well known clock or synchronizing circuit (not shown), it is, however, manifest that these pulses occur within the limits of time slots "I" and "II," respectively. Accordingly, when timing pulses 15 appear on terminal C during time slots "I," the waveform 13, which is present on terminal B, will pass through gate 12 and be coupled to terminal E. Note at this point, waveform 19 and its time coincidence with timing pulses 15, and its waveform similarity to waveform 13. In a similar fashion, when timing pulses 17 appear on terminal D during time slots "II," the waveform 13 will pass through gate 14 and be coupled to terminal F. Note also waveform 21 and its time coincidence and waveform similarity to pulses 17 and waveform 13, respectively. Gates 12 and 14 are also conventional in design in that they pass to their output terminal whatever signal voltage is present on their input terminal during the time duration of the timing pulses applied to their gate terminal.

The gated pulses 19 and 21 are then respectively coupled to the storage "I" integrator 16 and storage "II" integrator 18, respectively. Integrators 16 and 18 are conventional in design in that each translates the voltage energies applied to its input terminal into voltage amplitudes. The voltage amplitudes stored in integrators 16 and 18 respectively appear at terminals G and H (note waveforms 23 and 25), and are respectively coupled to one of the input terminals of summing amplifiers 20 and 22. Examples of a preferred "store-integrator" are disclosed in the above mentioned patent application, S.N. 348,210 and S.N. 356,147.

A bias voltage $\Delta v$ is coupled to the other input terminal of summing amplifiers 20 and 22 via terminal I, and in the example of FIGURE 1, this voltage is approximately 1 volt DC. The output of summing amplifiers 20 and 22, respectively appear at terminals J and K. Note that waveforms 23' and 25' of FIGURE 2 are substantially similar to waveforms 23 and 25, respectively, but are approximately 1 volt higher in amplitude. The summing amplifiers 20 and 22 are also of conventional design in that the algebraic summation of the voltages applied to their two input terminals appear at their output terminal. Examples of summing circuits which may be utilized in the present invention are disclosed in the above mentioned patent application S.N. 356,147, and in the patent application, S.N. 269,424, filed Apr. 1, 1963 of Marlin Van Wilson, now Patent No. 3,353,111, which is assigned to the assignee of the present invention.

Referring now to the slot "I" channel, which appears in the upper portion of FIGURE 1, a differential amplifier 24, a high gain amplifier 28 and a Schmitt trigger 32 are connected in a series circuit between the outputs of store "I" integrator 16 and summing amplifier 22 and one of the inputs of decoder 110.

The differential amplifier 24 receives at its positive input terminal, the output of integrator 16, which appears on terminal G, and receives at its negative input terminal, the output of the summing amplifier 22, which appears on terminal K. The output of differential amplifier 24, which appears on terminal L, is coupled to the high gain amplifier 28. The varying voltage signal appearing on terminal L is shown in FIGURE 2 as waveform 27, which represents waveform 23 minus waveform 25′ (G−K). The differential amplifier 24 is also of conventional design in that it includes two input terminals, a positive and a negative, with the output being high only when the voltage applied to its positive input terminal is higher than the voltage applied at its negative input terminal, and its output is low only when the inverse is the case. The high gain amplifier 28 is included for amplifying the voltage at terminal L so as to provide the proper voltage level to drive the Schmitt trigger 32. The Schmitt trigger 32 is also of conventional design in that it generates a digital output form at between two voltage limits depending upon the voltage applied to its input and its threshold bias level. The threshold of the Schmitt trigger 32 is provided by a DC bias as shown in FIGURE 1. The output of Schmitt trigger 32 is graphically represented in FIGURE 2 as waveform 29, which waveform appears at terminal M. Note at this point, the time relationship between waveform 27, which is the output of differential amplifier 24, and waveform 29, which is the output of Schmitt trigger 32. In the embodiment of FIGURE 1, a ZERO volt DC bias for Schmitt trigger 32 has been selected although any DC bias may be utilized instead depending, of course, upon circuit requirements. Accordingly, when waveform 27 exceeds or falls below the ZERO volt DC bias applied to the Schmitt trigger 32, Schmitt trigger 32 will be triggered or driven into its high or low state, as the case may be. The slot "I" output, which appears on terminal M, is then coupled to one input terminal of decoder 110.

Referring now to the slot "II" channel, which appears in the lower portion of FIGURE 1, a differential amplifier 26, a high gain amplifier 30 and a Schmitt trigger 34, each respectively similar to the differential amplifier 24, high gain amplifier 28 and Schmitt trigger 32 of the slot "I" channel, are connected in a series circuit between the outputs of store "II" integrator 18 and summing amplifier 20 and one of the inputs of decoder 110. The positive terminal of differential amplifier 26 is coupled to the output terminal J of the summing amplifier 27. Thus, waveform 23′, which appears at terminal J, is subtracted from waveform 25, which appears at terminal H, and this differential voltage (H−J) constitutes the output of differential amplifier 26 and appears at terminal N (note waveform 31). The high gain amplifier 30, amplifies the output of differential amplifier 26 and couples this amplified differential voltage to the Schmitt trigger 34. The output of Schmitt trigger 34, which appears at terminal P, is then coupled to the other input terminal of decoder 110. The threshold of Schmitt trigger 34 is also a ZERO volt DC bias. Note the time relationship between waveform 31, which is the output of differential amplifier 26, and waveform 33, which is the output of Schmitt trigger 34. Thus, when waveform 31 exceeds or falls below this ZERO volt DC bias, the Schmitt trigger 34 will be driven into its high or low state, as the case may be.

Figure 3:
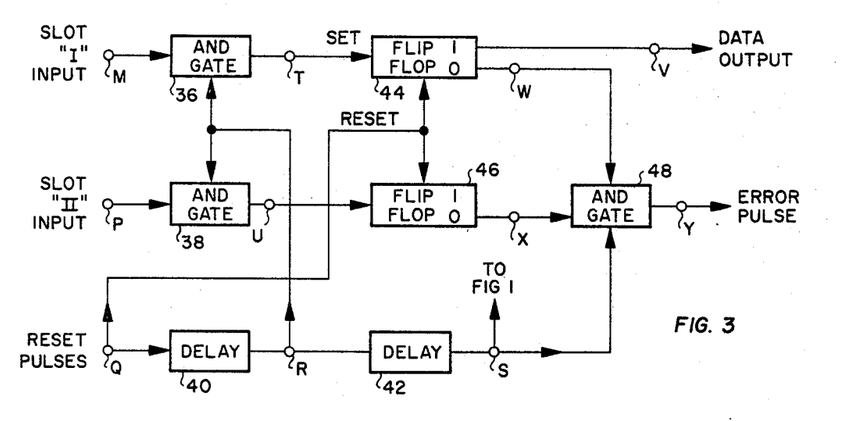
FIGURE 3 is a detailed block diagram of a majority decision decoder which may be utilized in combination with the detector FIGURE 1.
Figure 5:
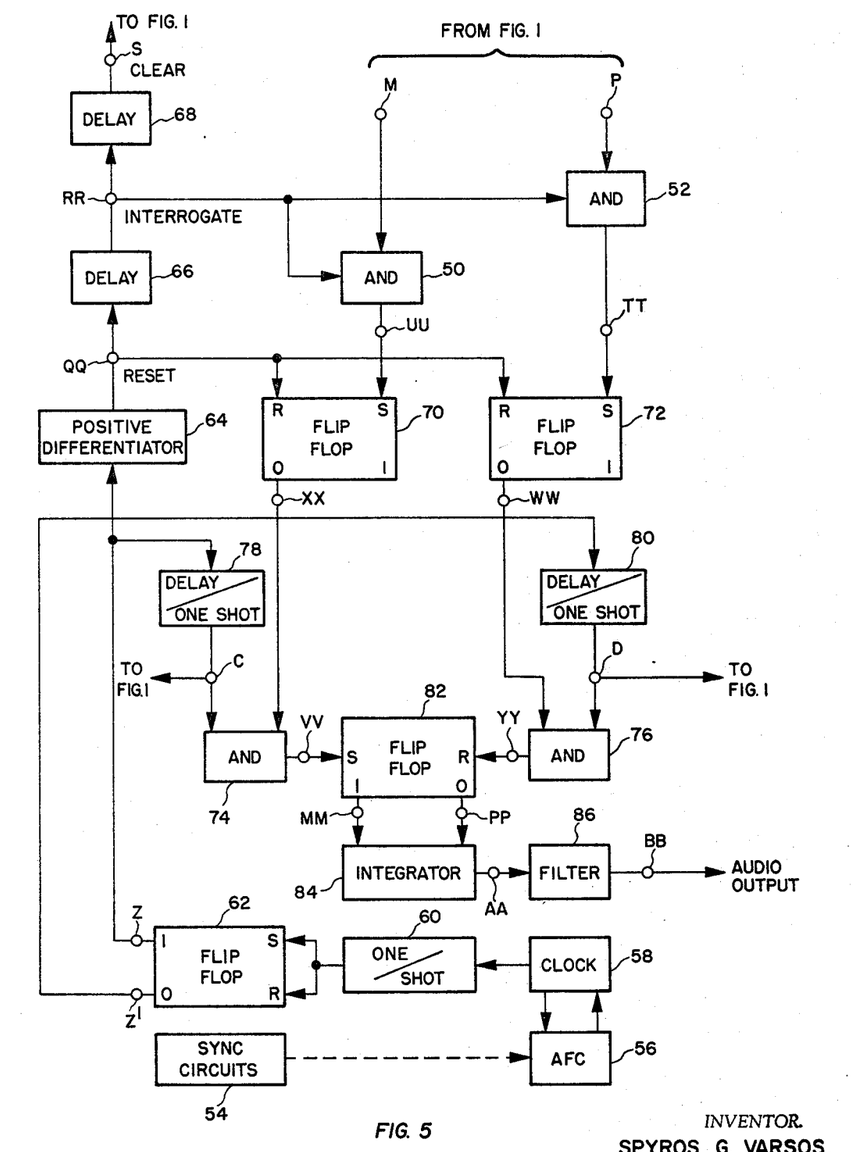
FIGURE 5 is a detailed block diagram of another decoder which may be utilized in combination with the detector of FIGURE 1.

The decoder 110 is preferably designed to analyze the digital information appearing on terminals M and P, which respectively represent the outputs of Schmitt triggers 32 and 34, and decide whether such digital information occurring during a sample period is a digital ONE or ZERO, and also decide whether an error exists. In addition, the decoder 110 may include conventional circuits to convert this digital intelligence into audio signals. The decoder 110, as shown in FIGURE 1, includes three output terminals, terminal V for data output, terminal Y for error pulse output, and terminal BB for audio output. Examples of two decoders which may be used in combination with the circuit of FIGURE 1 are represented in FIGURES 3 and 5.

The mode of operation of the circuit of FIGURE 1 is as follows:

Let it be assumed that time intervals $T_A$, $T_B$, $T_C$, and $T_D$, as well as time intervals $t_2$, $t_4$, $t_7$, $t_9$, $t_{12}$ and $t_{14}$ represent ends of sample periods. Also assume that time intervals $t_1$, $t_3$, $t_5$, $t_6$, $t_8$, $t_{10}$, $t_{11}$, $t_{13}$ and $t_{15}$ represent the middle of each sample period. Therefore, each sample period is divided into two equal halves, which will be hereafter referred to as time slots with the first half being referred to as time slot "I" and the second half being referred to as time slot "II."

During time period $T_A$–$t_2$, the RF modulated signals, as shown in waveform 11, are appropriately coupled to the input terminal A of the envelope detector 10. Envelope detector 10 separates the RF energy from the audio envelope, and develops an envelope waveform 13 as shown in FIGURE 2. The output of detector 10 is simultaneously coupled to one of the inputs of each of the analog gates 12 and 14. During time slot "I" of this sample period, the first gating or timing pulse 15 is applied to terminal C, thereby opening gate 12 and coupling waveform 13 to store "I" integrator 16 via terminal E. The gated pulses which are applied to store "I" integrator 16 are shown as waveform 19. A similar gating procedure occurs through gate 14. That is to say, during time slot "II" of this sample period, the first timing pulse 17 appears on terminal D and opens the gate 14 and passes waveform 13 to the store "II" integrator 18 via terminal F. The gated pulses applied to the store "II" integrator 18 are shown as waveform 21.

It should be noted at this point that one of the prime objectives of this invention is to decide or determine whether or not the energy contained in time slot "I" of any sample period exceeds or is less than the energy contained in time slot "II" of the same sample period by a predetermine value. Thus, once such decision or determination is made, subsequent circuits can determine whether the TSK intelligence received during this sample period is a digital ONE or a digital ZERO.

The first gated pulse 19 is accordingly stored in the store "I" integrator 16, as shown in waveform 23. Similarly, the first gated pulse 21 is stored in the store "II" integrator 18, as shown in waveform 25. The energy stored in the store-integrators 16 and 18 are independently and continuously summed with the bias voltage $\Delta V$ by the summing amplifiers 20 and 22, respectively. The stored energy in the store "I" integrator 16 is then differentially compared with the summation energy developed by the summing amplifier 22. Of course, in a similar manner the energy stored in the store "II" integrator 18 is differentially compared with the summation energy developed by the summing amplifier 20. Depending upon the voltage amplitude of the gated pulses occurring during time slots "I" and "II" of this sample period the Schmitt triggers 32 and 34 will be driven into their high or low conductive state. Note that when waveform 27 exceeds the DC bias applied to the Schmitt trigger 32, which bias is zero volts in this example, this Schmitt trigger is driven into its high or ONE conductivity state, as shown in waveform 29 during time slot "I." Accordingly, so long as the difference between the voltages on terminal G and K exceed zero volts, the Schmitt trigger 32 will remain in this high conductivity state. Also note that when waveform 31 exceeds the DC bias applied to the Schmitt trigger 34, which is also zero volts, this Schmitt trigger is driven into its high or ONE conductivity state. Thus, so long as the difference between the voltages on terminals H and J exceed zero volts, Schmitt trigger 34 will remain in this high conductivity state. Of course, in the example shown, the output of differential amplifier 26 is below the DC bias of the Schmitt trigger 34, as shown by waveform 31. Accordingly, Schmitt trigger 34 will be driven into its low or ZERO conductivity state, as shown by waveform 33.

It should be noted here, that when the difference in the energy occurring during the time slots "I" and "II" of any sample period exceeds the bias voltage $\Delta V$, one of the Schmitt triggers 32 or 34 will be triggered to its high conductivity state, whereas the other of such triggers will be driven to its low conductivity state. In the exemplary circuit of FIGURE 1, when Schmitt trigger 32 is high and Schmitt trigger 34 is low, the digit ZERO is represented, whereas the inverse conductivity states of these triggers represents digital ONE.

The outputs of Schmitt triggers 32 and 34 are then appropriately coupled to decoder 110, which is provided for advantageously utilizing the digital information present on terminals M and P. The specific decoder circuit will depend upon the desired signal output format. If, for example, the intelligence transmitted and accurately received and detected by the present invention is in a two level TSK format and digital data output is desired, interrogation of the slot "I" and slot "II" output terminals M and P may be at the end of each sample period. On the other hand, if the intelligence received is in a two level TSK format having a three sample period majority decision feature, as shown in FIGURE 2, interrogation may be made at the end of each third sample period. In this type of format of TSK modulation, the same digital intelligence is transmitted during three consecutive sample periods, or any odd number of consecutive sample periods. The decoder must therefore be adapted to interrogate only after each three sample periods and decide through a majority determination, what digit was received. This majority decision modulation technique may be utilized in systems where transmission time parameters permit its use for advantageously enhancing accuracy factors. An example of a decoder adapted for use in a system employing a majority decision feature is depicted in FIGURE 3 and will be described in detail below.

In addition, if it is desired to convert the digital intelligence received into audio intelligence, circuits may be included in the decoder 110 for converting digital data present on terminals M and P into audio signals. A preferred example of a circuit for providing audio signal outputs is shown in FIGURE 5, and will be described in detail below.

In the event that the difference between the energy occuring during the two time slots of any sample period does not exceed the bias voltage $\Delta V$, both of the Schmitt triggers 32 and 34 will be driven into their low conductivity state. Thus, the decoder 110 may be advantageously adapted to develop an error pulse in the event that the voltage at terminals M and P are boh low or to say it otherwise the Schmitt triggers 32 and 34 are both in their low conductivity state. This error pulse feature is considerably advantageous in view of the fact that when the energy difference between time slots "I" and "II" of any sample period is less than the bias voltage $\Delta V$, it is highly probable that excessive noise is occuring during at least one of the time slots of this particular sample period. Couple this fact with the fact that it is more accurate to utilize statistical techniques for determining what intelligence has occurred during any sample period in which excessive noise or extraneous energy exists than it would be to permit the decoder to arbitrarily and randomly select and determine what intelligence was transmitted. Accordingly, the error pulses developed by the decoder 110 of FIGURE 1 may be utilized to control "most-probably-pulse" circuits, such as the type above mentioned. In this connection note that during the sample period $t_{14}-T_D$, no pulse information is present during either of the time slots. Accordingly, the digital information that is coupled to the decoder 110 during sample period $t_{14}-T_D$ must indicate the fact that either excessive noise or no pulse exists. Attention is directed to waveforms 29 and 33 during time intervals $t_{14}-T_D$ wherein the Schmitt triggers 32 and 34 are both in their low conductivity state.

It will be apparent at this point that the novel self-authenticating pulse detector of FIGURE 1 is advantageously capable of developing digital data or audio signals when the difference in energy occurring during the time slots of any sample period exceeds a predetermined value, and adapted to develop an error signal when such predetermined energy difference is not exceeded.

It should be understood that the fixed bias $\Delta V$ may be variable and that the Schmitt triggers 32 and 34 may be any threshold device without departing from the spirit and scope of the present invention.

Figure 4:
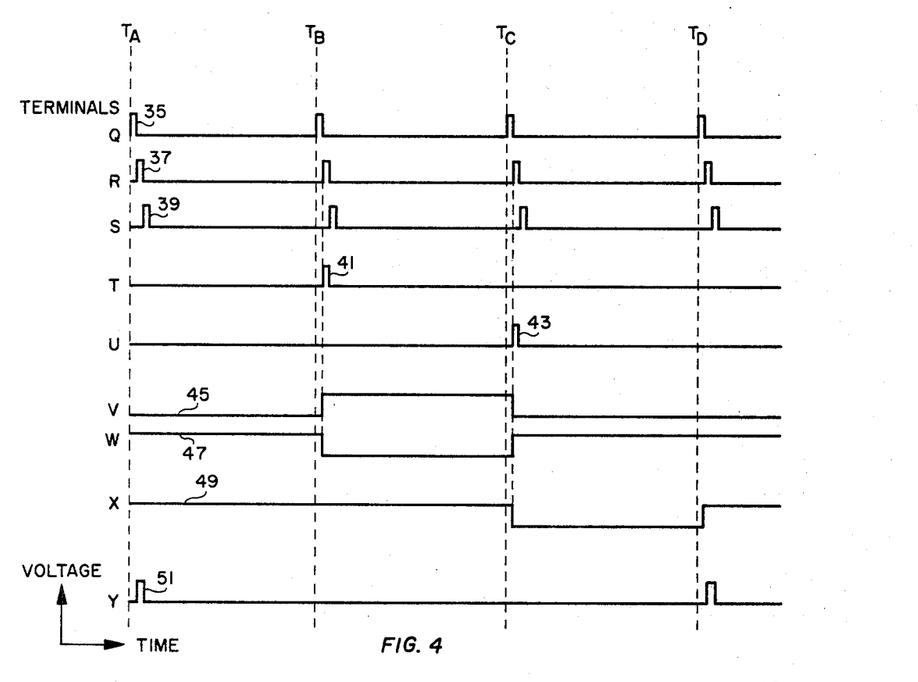
FIGURE 4 depicts waveforms present at several appropriate terminals in the block diagram of FIGURE 3, with the vertical dash lines, which represent pertinent time periods, being included to assist in the detailed explanation of the circuit of FIGURE 3 and its mode of operation when the decoder of FIGURE 3 is utilized in combination with the detector of FIGURE 1.

DETAILED DESCRIPTION OF FIGURES 3 AND 4

FIGURE 3 depicts a decoder which may be utilized as the decoder 110 of FIGURE 1 when it is desired to produce digital data output and an error pulse, as well as providing a majority decision feature. FIGURE 4 shows several waveforms present at pertinent terminals of the block diagram of FIGURE 3.

Referring to the left-hand portion of FIGURE 3, the slot "I" and slot "II" outputs present on terminals M and P of FIGURE 1 are coupled respectively to the AND gates 36 and 38. Gates 36 and 38 are controlled by interrogating pulses 37, which are developed by passing the reset pulses 35 through delay 40 and delaying pulse 35 a predetermined time. Note the time displacement between reset pulses 35 and interrogating pulses 37 in FIGURE 4. Although specific techniques for developing reset pulses, as well as the interrogating pulses for the gates 36 and 38, are not important to the present invenion it is mandatory, however, that such pulse developing means be capable of generating pulses having a sufficient voltage level to reset the circuit elements, and be in proper time coincidence with the desired sample periods. In the example shown, it is necessary that the reset pulses 35 be in time coincidence with the end of the sample periods $T_A-T_B$, $T_B-T_C$, $T_C-T_D$, etc. The reset pulses 35, which appear on terminal Q, are simultaneously coupled to the reset terminal of the flip-flops 44 and 46 for resetting purposes, and are also applied to the delay 40 for developing the interrogating pulses 37. The output of delay 40, which appears on terminal R, is utilized to gate the slot "I" and slot "II" signals through the AND gates 36 and 38, respectively, and is also applied to the delay 42. The delayed pulses 37 appear on terminal S, i.e., pulses 39, and are utilized to clear the store "I" integrator 16 and the store "II" integrator 18 of FIGURE 1. Pulses 39, which appear on terminal S, are also utilized to control the AND gate 48. Accordingly, the condition of flip-flops 44 and 46 determines whether or not an error pulse will be present on terminal Y, or whether digital data intelligence will appear on terminal V. The mode of operation of the circuit of FIGURE 3 is as follows:

At time $T_A$, the first reset pulse 35 appears on terminal Q and resets the flip-flops 44 and 46 to their ZERO digital state. Pulses 35 are then delayed a predetermined time by the delay 40, thus providing the interrogating pulses 37 on terminal R. When the interrogating pulses 37 appears on terminals R, the AND gates 36 and 38 are opened and the digital data present on terminal M and P, i.e., slots "I" and "II" inputs, is respectively coupled to the terminals T and U, which are the set terminals of the flip-flops 44 and 46. It should be noted at this point that when the slot "I" terminal M is high, the flip-flop 44 will be SET, and corresponding when the slot "II" terminal P is high, the flip-flop 46 will be SET. It should be recalled at this point that (1) digital data is desired only when the Schmitt triggers 32 and 34 are respectively in their digital ONE and ZERO states, or vice versa, and (2) it is desired to develop an error pulse only when the Schmitt triggers 32 and 34 are both in their digital ZERO state. Accordingly, when the flip-flop 44 is SET, digital data will be coupled to terminal V, and so long as flip-flop 44 is in a digital state opposite to that of flip-flop 46, digital data will appear on terminal V. However, whenever flip-flop 44 is in its digital ZERO state at the same time that flip-flop 46 is in its digital ZERO state, AND gate 48 will pass error pulse 51 to terminal Y when it is opened by pulse 39.

Note here, that during the time period preceding time period $T_A$–$T_B$ pulse 51 was developed, or to say it otherwise, the flip-flops 44 and 46 were both in their digital ZERO state. Accordingly, the first error pulse 51 was developed in substantial time coincidence with pulse 39.

At time period $T_B$, a sample or interrogation of the circuit of FIGURE 1 during the time period $T_A$–$T_B$ now takes place. Thus, when the second reset pulse 35 occurs, the flip-flops 44 and 46 are appropriately reset, and the second reset pulse 35 appropriately delayed by delay 40 and used to interrogate the current conducting states of Schmitt triggers 32 and 34. At this time interval, since the Schmitt triggers 32 and 34 are respectively in their digital ONE and digital ZERO condition, the flip-flops 44 and 46 are respectively driven into their digital ONE and digital ZERO states. Thus, when pulse 39 is applied to the AND gate 38 no error pulse is developed. However, digital data does appear on terminal V and may be appropriately utilized by subsequent circuitry.

The interrogation of time period $T_B$–$T_C$ occurs at time interval $T_C$. Note that the current conducting condition of Schmitt triggers 32 and 34 is now opposite to their current conducting condition during time interval $T_B$ and that digital data again appears on terminal V. Once again, no error pulse is developed when the pulse 39 is coupled to the AND gate 38.

When time period $T_C$–$T_D$ is interrogated at time interval $T_D$, an error pulse is now developed. This is so because the current conducting condition of both of the Schmitt triggers 32 and 34 is ZERO, and accordingly the flip-flops 44 and 46 are both driven into their digital ZERO state. Thus, no change occurs at terminal V, insofar as digital data output is concerned. However, an error pulse is coupled through AND gate 48 and appropriately present on terminal Y when pulse 39 is coupled thereto.

It will be apparent here, that the error pulse present on terminal Y may be utilized in many ways. For example, when an error pulse occurs on terminal Y, subsequent statistical circuits may be energized for determining what intelligence will be utilized during the sample period being interrogated. Examples of "most-probable-pulse" techniques are disclosed in the above mentioned patent applications, Ser. No. 335,718, (Patent No. 3,353,-108) Ser. No. 348,219 and Ser. No. 356,147. Also note at this point that the selection of three TSK time frames for each sample period merely exemplifies the majority decision capability of the present invention. Sample periods having more or less TSK time frames may be substituted without departing the spirit and scope of this invention. If desired, interrogation may be made at the end of each TSK time frame, thus demodulating the digital information occurring during each time frame without providing a majority decision feature. It is only in the interest of increased accuracy that the majority decision feature is utilized.

Figure 6A:
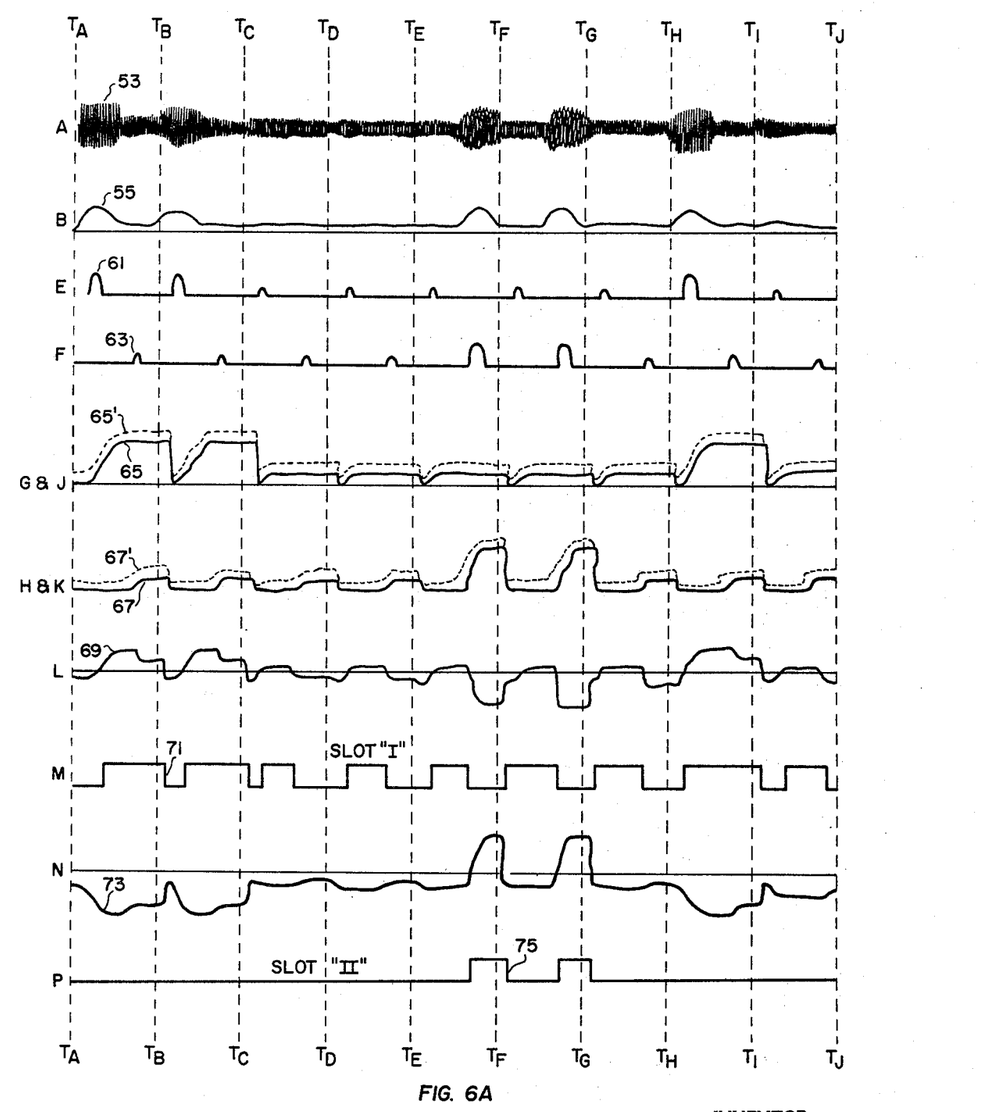
FIGURES 6A and 6B depict waveforms present at several appropriate terminals in the block diagrams of FIGURES 1 and 5, when the decoder of FIGURE 5 is utilized in combination with the detector of FIGURE 1.
Figure 6B:
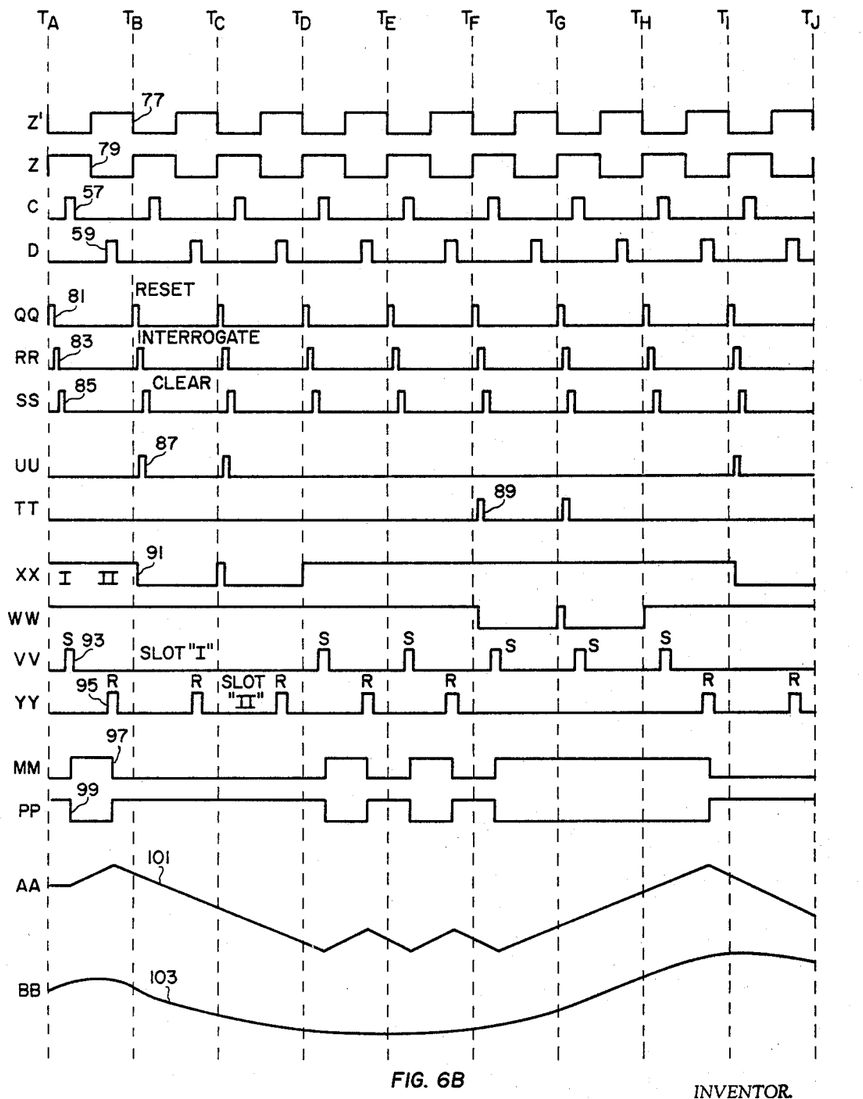

DETAILED DESCRIPTION IN FIGURES 5, 6A AND 6B

FIGURE 5 depicts a decoder which may be utilized as the decoder 110 of FIGURE 1 when it is desired to produce audio signals in a DATEC type communication system. An example of a DATEC system utilizing a TSK modulation format is disclosed in the Spyros G. Varsos patent application, Ser. No. 291,809 filed July 1, 1963, now Patent No. 3,339,142 which is assigned to the assignee of the present invention. FIGURES 6A and 6B show several waveforms present at pertinent terminals of the block diagram of FIGURE 5. Note that the waveforms present in the block diagram in FIGURE 1 are represented with a TSK modulation format with the interrogation intervals occurring at the end of the sample periods $T_A$–$T_J$. In this alternate embodiment of the decoder 110, no majority decision feature is provided.

A detailed description and mode of operation of the block diagram of FIGURE 1, as graphically represented by the waveforms of FIGURE 6A, is adequately described above with regard to the detailed description and mode of operation of FIGURE 1, as graphically represented by the waveforms of FIGURE 2. The primary objective of the circuit of FIGURE 5 is to decode the digital information developed by the novel self-authenticating pulse detector of FIGURE 1, which information is present on output terminals M and P of FIGURE 1, and to convert such digital information into audio intelligence. Thus, the circuit of FIGURE 5 is not only a decoder of digital intelligence but a demodulator as well.

Referring to the upper portion of FIGURE 5, the slots "I" and "II" digital information developed by the detector of FIGURE 1 are respectively coupled to the AND gates 50 and 52 via terminals M and P. The interrogation pulses used to control the AND gates 50 and 52 are developed as follows:

Conventional sync circuits 54 are utilized to control a conventional clock circuit 58 which includes a conventional AFC circuit 56. The pulses generated by the clock 58 are conventionally utilized to control a one shot generator 60, which in turn appropriately sets and resets the flip-flop 62. A detailed description of the operation of the sync circuit 54, AFC 56, clock 58, one shot 60 and flip flop 62 is contained in the above mentioned Varsos Patent No. 3,339,142.

The SET output Z of the flip-flop 62 is coupled to a positive differentiator 64 for developing the reset pulses for the circuit of FIGURE 5. Note waveform 79, which appears at terminal Z of flip-flop 62, and pulses 81, which appear on the output terminal QQ of positive differentiator 64. Terminal QQ is the reset terminal of the circuit of FIGURE 5. Pulses 81 are then delayed a predetermined time by delay 66, and such delayed pulses appear on terminal RR. Pulses 83, which appear on terminal RR, are the interrogating pulses of the circuit of FIGURE 5, and are utilized to control AND gates 50 and 52. In addition, pulses 83 are further delayed a predetermined time by the delay 68 and appear on terminal S. Pulses 85, which appear on terminal S, are utilized to clear the store "I" integrator 16 and the store "II" integrator 18 of FIGURE 1.

The outputs of the AND gates 50 and 52, which respectively appear on terminals UU and TT, are respectively coupled to the set terminals of flip-flops 70 and 72. The reset pulses 81, which appear on terminal QQ, are simultaneously coupled to the reset input terminals of flip-flops 70 and 72. Thus, when flip-flop 62 is SET, and correspondingly the reset pulse 81 are developed by the positive differentiator 64, the flip-flops 70 and 72 will be RESET, or in their digital ZERO state. Depending upon the current conducting or digital states of Schmitt triggers 32 and 34, when the interrogating pulses 83 open the AND gates 50 and 52, either or both of the flip-flops 70 and 72 may be SET to their digital ONE state.

It will be recalled at this point, that the primary objective of the circuit of FIGURE 1 is to develop digital intelligence relative to the current conducting states of the Schmitt triggers 32 and 34, and to do so only when Schmitt triggers 32 and 34 are respectively in their ONE and ZERO state, or vice-versa, and that no digital intelligence is to be developed when these Schmitt triggers are both in their digital ZERO state. Thus, it is only necessary to monitor the RESET or ZERO state of the flip-flops 70 and 72. Accordingly, only the reset output terminals of flip-flops 70 and 72 are respectively coupled to the AND gates 74 and 76.

The AND gates 74 and 76 are controlled by the timing pulses 57 and 59, which are also utilized as sampling pulses for the slot "I" and slot "II" analog gates 12 and 14 of FIGURE 1. Pulses 57 and 59 are developed by respectively coupling pulses 79 and 77, which respectively appear on terminals Z and Z', to the delay one-shots 78 and 80. The time delay of the delay one-shots 78 and 80 must be long enough to permit sampling of waveform 55, triggering of Schmitt triggers 32 and 34, and interrogation of the AND gates 50 and 52. When the timing pulses 57 appears on terminal C, it will pass through AND gate 74 and SET flip-flop 82 only if flip-flop 70 is in its RESET state. Similarly, timing pulse 59 will pass through AND gate 76 and RESET flip-flop 82 only if flip-flop 72 is in its ZERO state. Accordingly, if flip-flops 70 and 72 are respectively in their ONE and ZERO state, flip-flop 82 will be SET when pulse 57 passes through AND gate 74 but will not be RESET by pulse 59 since AND gate 76 is not open. However, if flip-flops 70 and 72 are respectively ZERO and ONE, flip-flop 82 will not be SET by pulse 57 but will be RESET by pulse 59. The output of flip-flop 82 will command integrator 84 to charge, when it is in its SET state, and discharge, when it is in its RESET state. In this respect, note waveform 101 during time periods $T_B$–$T_C$ and $T_F$–$T_G$. Of course, if both of the flip-flops 70 and 72 are in their ZERO states, flip-flop 82 will be first SET by pulse 57 and then RESET by pulse 59, thus developing a signal as shown in waveform 101 during time periods $T_D$–$T_E$ and $T_E$–$T_F$. Thus, the TSK intelligence decoded by the self-authenticating pulse detector of FIGURE 1, represents charge and discharge commands to the integrator 84. Accordingly, the output of integrator 84, which is graphically represented as waveform 101 in FIGURE 6B, will be a linearly varying waveform and by coupling such output to the filter 86, audio signals are developed and coupled to terminal BB, as graphically represented by waveform 103 of FIGURE 6B.

As mentioned above, since it is statistically more accurate to disregard intelligence during any sample period in which excessive noise or extraneous energy are concurrently present, the decoder of FIGURE 5 is adapted so as to disregard or reject commands developed during such sample periods. Thus, no commands are coupled to the integrator 84 unless the energy difference between slots "I" and "II" during any sample period is greater than a predetermined value, i.e., bias $\Delta V$. Accordingly, when the integrator 84 has been commanded to charge or discharge, and the energy difference between slots "I" and "II" of any sample period is not greater than bias $\Delta V$, for example, integrator 84 will continue to charge or discharge as the case may be until such time as the desired energy difference between slots "I" and "II" during a subsequent sample period exists. Of course, should the energy difference between slots "I" and "II" be as desired, and the command to the integrator 84 during this later sample period is the same as it was during the previous sample period, the integrator 84 will continue to charge or discharge as the case may be. The mode of operation of the decoder of FIGURE 5 is as follows:

At time $T_A$, the flip-flop 62 is SET and a positive voltage is differentiated by the positive differentiator 64, thereby developing the first reset pulse 81. Reset pulse 81 first drives flip-flops 70 and 72 into their RESET state and is then delayed by delay 66, thus developing the interrogating pulse 83. Interrogating pulse 83 opens the AND gates 50 and 52, and at time $T_A$, flip-flops 70 and 72 remain RESET.

During time period $T_A$–$T_B$, the flip-flops 70 and 72 will remain in their RESET state, thus providing a voltage sufficient to hold open AND gates 74 and 76. Note waveforms 91 and 91' respectively present on terminals XX and WW. Since AND gate 74 is open during this time period, when the first timing pulse 57 appears on terminal C, it passes through AND gate 74 and SETS flip-flop 82. Note the time coincidence between gated pulse 93, which appears on terminal VV, and waveforms 97 and 99, which respectively appear on terminals MM and PP. Now that flip-flop 82 is in its SET state, integrator 84 is commanded to charge, as shown in waveform 101. Next, the first timing pulse 59 appears on terminal D and since AND gate 76 is also open, pulse 59 passes through AND gate 76 and RESETS flip-flop 82. Again note the time coincidence between gated pulse 95 which appears on terminal YY and waveforms 97 and 99. Now that flip-flop 82 is in its RESET state, it commands integrator 84 to discharge, as shown in waveform 101. The waveform 101 is then coupled to filter 86 which develops the audio wave 103.

At time $T_B$, the flip-flop 62 is again triggered by the one-shot 60 (note waveforms 77 and 79), and the positive differentiator 64 develops a second reset pulse 81, which appears on terminal QQ. Again flip-flops 70 and 72 are RESET, as shown in waveforms 91 and 91'. The second reset pulse 81 is then appropriately delayed by delay 66, thus developing a second interrogating pulse 83. This second interrogating pulse 83 opens AND gates 50 and 52, and since the Schmitt triggers 32 and 34 are in their ONE and ZERO states, respectively, a pulse appears on terminal UU, whereas no pulse appears on Terminal TT. Pulse 87, which appears on terminal UU, SETS flip-flop 70, whereas flip-flop 72 remains in its RESET condition. Accordingly, since the voltage levels on terminals XX and WW during time period $T_B$–$T_C$ are respectively low and high, the AND gate 74 is not opened during this time period, while AND gate 76 is opened. Thus, when the second timing pulse 57 appears on terminal C, it does not pass through AND gate 74 to the SET terminal VV of flip-flop 82. The flip-flop 82 is not SET when the second timing pulse 57 appears on terminal C, and the discharge command to integrator 84 is therefore continued. However, when the second timing pulse 59 appears on terminal D, it does pass through AND gate 76 and appear on the RESET terminal YY of flip-flop 82. Since flip-flop 82 had been previously driven into its RESET condition, the second timing pulse 59 has no effect upon flip-flop 82 during time period $T_B$–$T_C$, and accordingly the discharge command to integrator 84 continues. Note here the downwardly linear slope of waveform 101 during time period $T_B$–$T_C$. Also note that waveform 101 continues to slope downward during time period $T_C$–$T_D$. This is so because the current conducting states of Schmitt triggers 32 and 34 when the third interrogation pulse 83 occurs at time interval $T_C$, is respectively ONE and ZERO.

At times $T_D$ and $T_E$ both of the Schmitt triggers 32 and 34 are in their ZERO state. This is due to the fact that no signal pulse intelligence is received during time periods $T_C$–$T_D$ and $T_D$–$T_E$. Thus, when the interrogating pulses 83 opens AND gates 50 and 52, the flip-flops 70 and 72 each remain in their RESET state, and AND gates 74 and 76 are held open. Accordingly, when the timing pulses 57 and 59 respectively appear on terminals C and D, the flip-flop 82 is first SET and then RESET. Note the rising and falling slopes of waveform 101 during time periods $T_D$–$T_E$ and $T_E$–$T_F$, and the time coincidence between waveform 101, the SET and RESET pulses 93 and 95, and the output waveforms 97 and 99 of flip-flop 82.

At time T_F, the current conducting states of Schmitt triggers 32 and 34 are now ZERO and ONE, respectively. This is so because the energy received at terminal A during time slot "I" is less than the energy received during time slot "II" by the desired ΔV value. Accordingly, flip-flop 70 remains in its RESET state when the interrogating pulse 83 occurs, whereas flip-flop 72 is SET at this time. Thus, AND gate 74 is open whereas AND gate 76 is not. When timing pulse 57 occurs it passes through AND gate 74, while timing pulse 59 does not. In effect flip-flop 82 is SET by pulse 93, which appears on terminal VV, but is not RESET because a RESET pulse 95 does not appear on terminal YY during this time period. The flip-flop 82 now commands integrator 84 to charge, as shown in waveform 101, and continues to command integrator 82 to charge during time period T_G–T_H, since the conducting states of Schmitt triggers 32 and 34 are again respectively ZERO and ONE.

At time T_H, again both of the Schmitt triggers 32 and 34 are in their ZERO states. Accordingly, the circuit of FIGURE 5 when interrogated at time T_H operates in the same manner as stated with regard to the interrogation time interval T_D (note waveform 101 during time period T_D–T_E). Thus, no change in the command to integrator 84 occurs and it appropriately continues to charge during time period T_H–T_J.

At times T_I and T_J, the current conducting states of Schmitt triggers 32 and 34 are again respectively ONE and ZERO, and once again the flip-flop 82 commands the integrator 84 to discharge in the same manner as stated above respecting the interrogation time interval T_B (note waveform 101 during time period T_B–T_C).

It will be apparent here, that when the energy difference between slots "I" and "II" of any sample period is greater than ΔV, the digital states of the Schmitt triggers 32 and 34 of FIGURE 1 are decoded by the circuit of FIGURE 5 and converted into audio signals. On the other hand, when the energy difference beween slots "I" and "II" of any sample period is less ΔV, the digital states of Schmitt triggers 32 and 34 are not decoded, but instead the circuit of FIGURE 5 substantially disregards the intelligence received during this sample period.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

I claim:
1. A detector for demodulating pulse position modulated intelligence contained in sample periods in which spurious pulses may also occur, said detector comprising in combination:
  (a) means for developing two signals respectively representative of the energy contained in the largest and the next largest pulse present during any one sample period; and
  (b) means for developing an output signal indicative of the intelligence present during said one sample period whenever the energy of said largest pulse exceeds the energy of said next largest pulse by a predetermined value.

2. A detector for demodulating pulse position modulated intelligence contained in sample periods in which spurious pulses may also occur, said detector comprising, in combination:
  (a) means for developing two signals respectively representative of the energy contained in the largest and the next to largest pulse present during any one sample period;
  (b) means for developing output signals indicative of the intelligence present during said one sample period whenever the energy of said largest pulse exceeds the energy of said next largest pulse by a predetermined value; and
  (c) said last named means being capable of also developing an error signal whenever the energy difference between said largest pulse and said next largest pulse is less than said predetermined value.

3. A detector for demodulating pulse position modulated intelligence contained in sample periods in which spurious pulses may occur, said detector comprising, in combination:
  (a) means for developing two signals respectively representative of the energy contained in the largest and the next largest pulse present during any one sample period;
  (b) means for developing output signals indicative of the intelligence present during said one sample period whenever the energy of said largest pulse exceeds the energy of said next largest pulse by a predetermined value; and
  (c) said output signals developed by said last named means are audio frequency signals.

4. A detector for demodulating pulse position modulated intelligence of the type in which each sample period contains at least two pulse position time frames, said detector comprising, in combination:
  (a) means for independently comparing, during any one sample period, the energy contained in each of said time frames with the energy contained in each of the other of said time frames; and
  (b) means for developing output signals indicative of the intelligence contained in said one sample period whenever the time frame having the highest level of energy exceeds the time frame having the next highest level of energy by a predetermined value.

5. A detector in accordance with claim 4 wherein:
  (a) said output signals developed by said last named means are digital data signals; and
  (b) said last named means also develops an error signal when the energy difference between said time frame having the highest level of energy and said time frame having the next highest level of energy is less than said predetermined value.

6. A detector in accordance with claim 4 wherein:
  (a) said output signals developed by said last named means are audio frequency signals.

7. A self-authenticating pulse detector for demodulating intelligence transmitted in a pulse modulation format in which each sample period is divided into two equal time slots, said detector comprising, in combination:
  (a) storing means for independently storing the energy contained in each of said time slots so as to develop first and second storage voltages;
  (b) summing means for independently summing said storage voltages with a predetermined bias voltage so as to develop first and second summation voltages;
  (c) comparing means for comparing said first storage voltage with said second summation voltage so as to develop a first comparison voltage, and for comparing said second stored voltage with said first summation voltage so as to develop a second comparison voltage;
  (d) first and second threshold means respectively responsive to said first and second comparison voltages, each of said threshold means being driven to its high current conductive state whenever its respective comparison voltage exceeds a predetermined threshold voltage; and
  (e) decoding means adapted to develop digital data output signals representative of the intelligence contained in said sample periods whenever one only of said threshold means is in its high current conductive state, and adapted to develop error signals whenever both of said threshold means are in the same current conductive state.

8. A self-authenticating pulse detector for demodulating intelligence transmitted in a pulse modulation format in which each sample period is divided into two equal time slots, said detector comprising, in combination:
 (a) storing means for independently storing the energy contained in each of said time slots so as to develop first and second storage voltages;
 (b) summing means for independently summing said storage voltages with a predetermined bias voltage so as to develop first and second summation voltages;
 (c) comparing means for comparing said first storage voltage with said second summation voltage so as to develop a first comparison voltage, and for comparing said second stored voltage with said first summation voltage so as to develop a second comparison voltage;
 (d) first and second threshold means respectively responsive to said first and second comparison voltages, each of said threshold means being driven to its high current conductive state whenever its respective comparison voltage exceeds a predetermined threshold voltage;
 (e) decoding means adapted to develop digital data output signals representative of the current conductive states of said threshold means, and
 (f) said decoding means being adapted to convert said digital data output signals into audio frequency signals whenever one only of said threshold means is in its high current conductive state, thereby representing the intelligence contained in each of said sample periods.

9. A self-authenticating pulse detector for demodulating intelligence transmitted in a pulse modulation format in which each sample period is divided into two equal time slots, said detector comprising, in combination:
 (a) gating means for gating to a first storage means all pulse energy occurring during the first of said two time slots, and for gating to a second storage means all pulse energy occurring during the second of said two time slots;
 (b) said first and second storage means being capable of developing first and second storage voltages;
 (c) summing means for independently summing said storage voltages with a predetermined bias voltage so as to develop first and second summation voltages;
 (d) comparing means for comparing said first storage voltage with said second summation voltage so as to develop a first comparison voltage, and for comparing said second storage voltage with said first summation voltage so as to develop a second comparison voltage;
 (e) first and second threshold means respectively responsive to said first and second comparison voltages, each of said threshold means being driven to its high current conductive state whenever its respective comparison voltage exceeds a predetermined threshold voltage; and
 (f) decoding means adapted to develop output signals representative of the intelligence contained in said sample periods whenever one only of said threshold means is in its high current conductive state.

10. A self-authenticating pulse detector in accordance with claim 9 wherein:
 (a) said summing means are summing amplifiers;
 (b) said comparing means are differential amplifiers; and
 (c) said threshold means are Schmitt triggers.

11. A self-authenticating pulse detector in accordance with claim 10 wherein:
 (a) said output signals developed by said decoding means are digital data signals; and
 (b) said decoding means also develops an error signal whenever said triggers are in the same current conductive state.

12. A self-authenticating pulse detector in accordance with claim 10 wherein:
 (a) said output signals developed by said decoding means are audio frequency signals.

13. A self-authenticating pulse detector for demodulating intelligence transmitted in a pulse modulation format in which each sample period is divided into two equal time slots, said detector comprising, in combination:
 (a) first and second analogue gates for respectively gating the energy occurring during each of said time slots to first and second storage circuits;
 (b) said first and second storage means being capable of developing first and second storage voltages;
 (c) a bias voltage;
 (d) first and second summing amplifiers for independently summing said bias voltage with each of said storage voltages so as to develop first and second summation voltages;
 (e) a first differential amplifier for differentially comparing said first storage voltage and said second summation voltage so as to develop a first difference analogue voltage;
 (f) a second differential amplifier for differentially comparing said second storage voltage and said first summation voltage so as to develop a second difference analogue voltage;
 (g) first and second trigger circuits for respectively converting said first and second difference analogue voltages to first and second digital voltages; and
 (h) a decoding circuit responsive to said first and second digital voltages for developing output signals representative of the intelligence contained in said sample periods whenever the energy occurring during one of said time slots of any one sample period exceeds the energy occurring during the other of said time slots of said one sample period by a value greater than said bias voltage.

14. A self-authenticating pulse detector in accordance with claim 13 wherein:
 (a) said output signals developed by said decoding means are digital data; and
 (b) said decoding means also develops an error signal whenever the energy difference between said two time slots of said one sample period is less than the value of said bias voltage.

15. A self-authenticating pulse detector in accordance with claim 13 wherein:
 (a) said output signals developed by said decoding means are audio frequency signals.

References Cited
UNITED STATES PATENTS
2,446,244 8/1948 Richmond __________ 343—13
3,212,014 10/1965 Wiggins et al. _______ 329—107

MALCOLM A. MORRISON, *Primary Examiner.*

C. E. ATKINSON, *Assistant Examiner.*